J. B. Sexton.
Cultivator.

No. 88,915. Patented Apr. 13, 1869.

Witnesses:
Wm. A. Morgan
Philip C. Dieterich

Inventor,
James B. Sexton
per. M. Mum &Co.
Attorneys.

United States Patent Office.

JAMES B. SEXTON, OF PELLA, IOWA, ASSIGNOR TO HIMSELF AND J. L. ANDREW, OF THE SAME PLACE.

Letters Patent No. 88,915, dated April 13, 1869.

IMPROVEMENT IN CULTIVATORS.

The Schedule referred to in these Letters Patent and making part of the same.

*To all whom it may concern:*

Be it known that I, JAMES B. SEXTON, of Pella, in the county of Marion, and State of Iowa, have invented a new and improved Cultivator; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
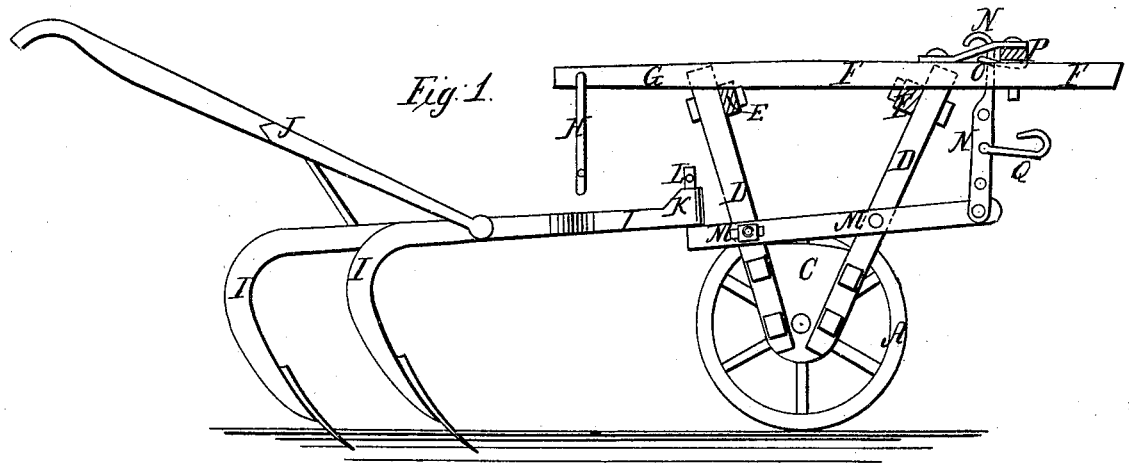
Figure 1 is a vertical longitudinal section of my improved cultivator, taken through the line $x\ x$, fig. 2.

My invention has for its object to improve the construction of the parts of a cultivator by means of which the plow-beams and draught are connected with the truck, so as to make the plows readily adjustable, and so as to enable the draught to be readily adjusted, according to the comparative strength of the two horses; and It consists in the construction and combination of the various parts by means of which this is effected, as hereinafter more fully described.

A are the wheels of the truck, the axes B of which are secured to the plates C, to each of which plates are also securely bolted the lower ends of the two side-bars D, the upper ends of each pair of which are securely bolted to the ends of the cross-bars E, as shown in the drawings.

Figure 2:
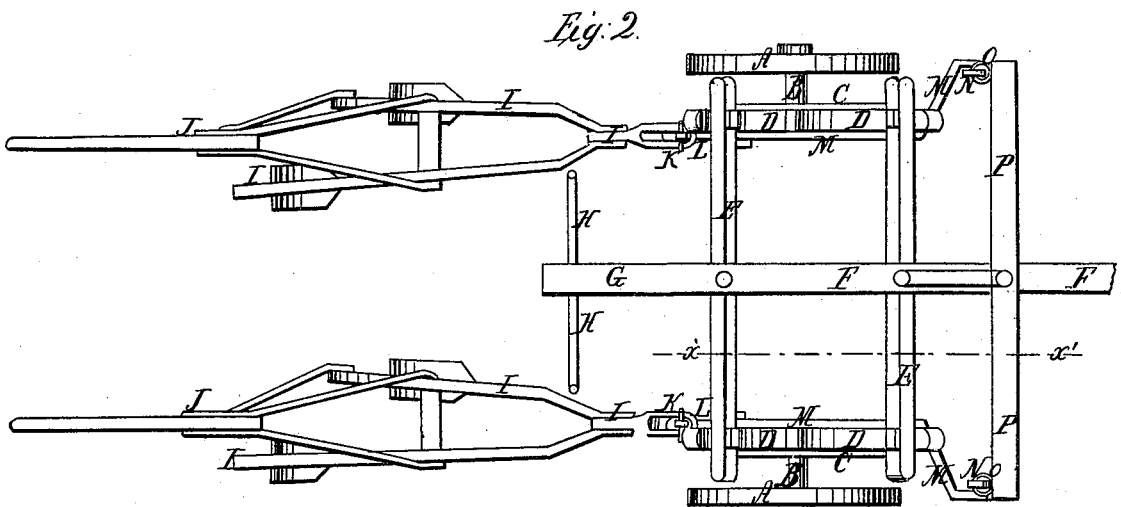
Figure 2 is a top or plan view of the same.

F is the tongue, which is secured to the middle parts of the cross-bars E, as shown in figs. 1 and 2.

G is a bar, projecting at the rear side of the truck-frame, and which may be the rearwardly-projecting end of the tongue F, or a separate bar, as may be desired.

To the rear end of the bar G is attached a bent bar or bars, H, having a hook formed upon each of their downwardly-projecting ends, so that the plow-beams may be hooked upon them, to hold the plows away from the ground in passing from place to place.

I are the plow-beams, the rear parts of each of which are branched, said branches being of different lengths, and are bent downwards, to form standards for the attachment of the plows.

The handles J are attached to the plow-beams I, and are inclined to one or the other side, to enable the operator to walk at the side of the row of plants being cultivated.

The vertical thickness of the forward ends K of the plow-beams I is increased, and through them are formed vertical elongated sockets, slots, or loops, through which pass the straight hooks I, formed upon the rear ends of the draught-bars M, and upon which the said sockets are secured by pins passing through the upwardly-projecting ends of the said straight hooks L.

This construction enables the plows to operate equally well at any desired elevation, or when working at any desired depth in the ground.

The draught-bars M are securely bolted to the side-bars D of the truck-frame, the bolts of the rear bars D passing through slots in the bars M, to allow the rear ends of the said bars M to be raised or lowered, to adjust the depth at which the plows run in the ground without its being necessary to form several holes in said bars to receive the bolts when the beams M are adjusted in different positions.

The forward parts of the draught-bars M are bent or inclined outward, and to their ends are pivoted the lower ends of the bars N, the upper ends of which pass up through the rearwardly-projecting loops O, attached to the ends of the double-tree P.

The upper ends of the bars N work freely in the loops O, and are prevented from escaping from said loops by being bent over, or having hooks formed upon their said upper ends, as shown in fig. 1.

The bars N have several holes formed in them, at different elevations, to receive the hooks Q, upon which the whiffle-trees are hooked.

By this construction, when horses of different strength are attached to the cultivator, by lowering the hook Q, with which the stronger horse is connected, so as to bring the point of draught-attachment nearer to the pivoting-point of the bars N, the draught of said horse will be proportionately increased.

The double-tree P is pivoted at its middle point, and secured to the tongue by a pin and hammer-strap, in the ordinary manner.

Having described my invention,

I claim as new, and desire to secure by Letters Patent—

1. The slotted draught-bars M, constructed and operating in connection with the frame D E, plow-beams I, and draught-device N O P Q, substantially as herein shown and described, and for the purpose set forth.

2. The bars N, having one or more holes formed in them, hooks Q, and loops O, in combination with the draught-bars M and double-tree P, substantially as herein shown and described, and for the purpose set forth.

JAMES B. SEXTON.

Witnesses:
H. C. DAY,
P. H. KENNEDY.